United States Patent
Hewins et al.

(10) Patent No.: US 12,161,245 B2
(45) Date of Patent: Dec. 10, 2024

(54) LIQUID HEATING APPARATUS

(71) Applicants: Strix Limited, Isle of Man (GB); Strix Guangzhou Limited, Guangzhou (CN)

(72) Inventors: Jacob Alexander John Hewins, Santon (GB); Peter Anthony Pearce, Regaby (GB)

(73) Assignee: STRIX (CHINA) LIMITED, Guangzhou (CN)

(*) Notice: Subject to any disclaimer, the term of this patent is extended or adjusted under 35 U.S.C. 154(b) by 684 days.

(21) Appl. No.: 17/599,298

(22) PCT Filed: Mar. 27, 2020

(86) PCT No.: PCT/GB2020/050830
§ 371 (c)(1),
(2) Date: Sep. 28, 2021

(87) PCT Pub. No.: WO2020/193989
PCT Pub. Date: Oct. 1, 2020

(65) Prior Publication Data
US 2022/0151426 A1    May 19, 2022

(30) Foreign Application Priority Data
Mar. 28, 2019  (GB) .................................... 1904319

(51) Int. Cl.
*A47J 27/21*    (2006.01)
(52) U.S. Cl.
CPC ..... *A47J 27/21041* (2013.01); *A47J 27/2105* (2013.01); *A47J 27/21166* (2013.01)

(58) Field of Classification Search
CPC .................. A47J 27/21; A47J 27/21008; A47J 27/21016; A47J 27/21041; A47J 27/2105;
(Continued)

(56) References Cited

U.S. PATENT DOCUMENTS

| 2,568,474 | A | * | 9/1951 | Van Sciver | ....... A47J 27/21008 137/341 |
| 3,696,733 | A | * | 10/1972 | Beverett | ............. A47J 31/0573 99/315 |

(Continued)

FOREIGN PATENT DOCUMENTS

| AU | 2011100683 A4 | 7/2011 |
| DE | 19857165 C2 | 11/2000 |

(Continued)

OTHER PUBLICATIONS

Chinese office action for CN202080026706.9 dated Mar. 10, 2022.

*Primary Examiner* — Sang Y Paik
(74) *Attorney, Agent, or Firm* — Getz Balich LLC

(57) ABSTRACT

A reservoir of a liquid heating appliance includes a first chamber and a second chamber, separated by a partition. A heating arrangement is arranged to heat liquid in the first chamber. A first valve, a second valve and a float valve are disposed in the partition to selectively allow liquid to flow between the first and second chambers. Respective lines joining the first and second valves to a center of the partition have an obtuse angular separation. The first and second valves are selectively closed by a valve closure member. The float valve includes a floating valve member arranged to float and mate with a valve seat to prevent the flow of liquid. A liquid outlet in the first chamber connects with a dispense outlet on the appliance to allow liquid to be dispensed when the first and second valves are closed.

20 Claims, 15 Drawing Sheets

(58) Field of Classification Search
CPC ............ A47J 27/21115; A47J 27/21166; A47J 31/402
USPC ........................................................ 392/444
See application file for complete search history.

(56) References Cited

U.S. PATENT DOCUMENTS

2011/0033176 A1    2/2011   Garvey
2011/0215085 A1    9/2011   Garvey

FOREIGN PATENT DOCUMENTS

| EP | 1980181 A2 | 10/2008 |
| GB | 2466839 A | 2/2009 |
| WO | 2008139173 A2 | 11/2008 |
| WO | 2010094945 A2 | 8/2010 |
| WO | 2011077136 A1 | 6/2011 |

* cited by examiner

LIQUID HEATING APPARATUS

This application is entitled to the benefit of, and incorporates by reference essential subject matter disclosed in PCT Application No. PCT/GB2020/050830 filed on Mar. 27, 2020, which claims priority to GB Patent Appln. No. 1904319.9 filed Mar. 28, 2019, which are hereby incorporated by reference in their entireties.

BACKGROUND OF THE INVENTION

1. Technical Field

The present invention relates to liquid heating appliances, in particular to liquid heating appliances capable of selectively heating a small volume of liquid.

2. Background Information

Liquid heating appliances, such as kettles, are common in many households. Kettles can be used to heat volumes, often up to 1.7 l, of water, to boiling. However, users frequently only need to heat a relatively small volume of water to boiling, for example if they are making a single hot drink. Depending on the kettle it can be difficult to accurately fill the kettle with the correct amount of water for a single drink, and as a result kettles are regularly over filled. This overfilling results in more energy being required to heat the volume of water to the desired temperature. As kettles typically have a fixed power output, this ultimately results in a user having to wait a longer period of time for the water to reach the desired temperature. Further, not only does it mean a user has to wait a longer time, the extra energy required to heat the surplus volume of water is often wasted as the surplus water is typically left to cool in the kettle. Kettles are commonly used multiple times a day, by millions of people worldwide, and as a result, the amount of energy wasted in heating unused volumes of water is significant.

One attempt to address the problems described above can be seen in WO 2010/094945. There is disclosed therein an appliance having a water heating chamber divided into first and second heating chambers separated by a partition. A user actuable valve selectively opens and closes fluid communication between the first and second heating chambers. The first chamber is heated directly by a heating element. Depending on the volume of water a user wishes to heat, they can control the user actuable valve either to close the first, lower chamber, such that only the water in the first chamber is heated, or to open the valve such that the water in both the first and second chambers is heated. As seen in FIGS. 2c and 2d of WO '945, the user actuable valve comprises a series of apertures arranged in a circle on one side of the partition. The apertures are selectively closed by a user actuated rotary valve plate.

As will be appreciated by those skilled in the art, in order to operate the appliance disclosed in WO '945, a user must first fill the reservoir with water. They must then operate the user actuable valve depending on the desired mode of operation. If they wish to dispense a smaller volume by only heating the water in the first chamber, they must first open the user actuable valve, allow water to fill the first chamber, and then close the user actuable valve once the first chamber is full. Following operation, once the water has been heated and dispensed, if a user wishes to operate the appliance again to heat only water in the first chamber, they must again open the user actuable valve, allow water to fill the first chamber, and then close the user actuable valve again. Having to open and close the valve every time a volume of heated liquid is required is inconvenient, especially when a user expects to be able to heat a small volume of liquid for a fast operation.

SUMMARY OF THE INVENTION

The present invention aims to provide an improved appliance and when viewed from a first aspect the present invention provides a liquid heating appliance comprising: a liquid reservoir comprising a first chamber arranged below a second chamber and separated by a partition extending therebetween, a heating arrangement arranged to heat, in use, liquid contained within the first chamber; a first valve, a second valve and a float valve disposed in the partition to selectively allow liquid to flow between the first and second chambers, wherein said first and second valves are arranged such that respective lines joining the first and second valves to a center of the partition have an obtuse angular separation and wherein the float valve comprises a floating valve member arranged to float and mate with a valve seat and thereby close the valve in order to prevent the flow of liquid through the valve; at least one valve closure member arranged selectively to close said first and second valves; and a liquid outlet in the first chamber in fluid communication with a dispense outlet provided on the appliance so as to allow liquid to be dispensed from the first chamber when the first and second valves are closed.

Thus it will be seen by those skilled in the art that a liquid heating appliance may effectively be operated in two different modes. It may be operated in a first mode, with the first and second valves closed, in which it is used to dispense a fixed volume of liquid directly from the first chamber, i.e. a 'hot-cup' mode. As a result, the appliance may quickly heat a smaller volume of liquid when required. The appliance may also operate in a second mode with the first and second valves open. In this mode, liquid will flow between the first and second chambers as liquid in the first chamber is heated by the heating arrangement. The second mode may be considered to correspond to a 'kettle' mode. A user may select the type of operation, by controlling the position of the valve closure member(s), depending on the volume of heated liquid they require.

In use, as the liquid reservoir is filled with liquid, due to the floating valve member in the float valve, the liquid will be free to flow from the second chamber into the first chamber via the float valve. Providing the reservoir is filled with a sufficient amount of liquid, this will cause the floating valve member to float and mate with its valve seat.

Once the floating valve member is mated with its seat this will close the first chamber thereby preventing any further liquid from entering or leaving the first chamber. The heating arrangement may then be operated to heat the volume of liquid in the first chamber.

Advantageously, due to the arrangement of the floating valve member, when used in the hot-cup mode, the liquid heating appliance automatically closes off the first chamber when it has been filled with the predefined volume of liquid, and does not require any interaction from a user. This is in contrast to the user actuable valve seen in WO '945 and described above which requires interaction from a user to close the user actuable valve. This therefore simplifies operation of the appliance for the user.

With the first and second valves closed, in the hot-cup mode of operation, when the heating arrangement is operated, it will cause the temperature of the liquid in the first chamber to increase. As the liquid within the first chamber cannot escape its temperature will continue to rise. As the temperature increases, and eventually reaches boiling, the pressure within the first chamber will increase. This pressure may be used as a means to force the liquid out of the first chamber via the liquid outlet towards the dispense outlet. Of course additional or alternative means for dispensing may be provided, for example a pump arranged to draw the heated water from the first chamber. Irrespective of the means for dispensing, the steam pressure resulting from boiling the liquid will hold the floating valve member such that it is mated with its seat, thereby holding the float valve closed.

Once all of the liquid has been dispensed from the first chamber, and the steam pressure drops, the floating valve is no longer held against its valve seat, thereby allowing liquid to refill the first chamber. Again, as the first chamber is filled, the floating valve member will float and mate with the valve seat thereby closing the float valve thus closing the first chamber. The liquid heating appliance is then immediately ready to be operated in the hot-cup mode again. Accordingly, as will be appreciated by those skilled in the art, the liquid heating appliance according to the present invention is configured to automatically refill and close the first chamber such that it can quickly, and more easily, be operated in the hot-cup mode again.

With the first and second valves open, i.e. with the appliance operating in the kettle mode, when the heating arrangement is operated, e.g. supplied with electrical power, liquid in the first chamber will be heated and convection currents will develop which result in heated water flowing out of the first chamber into the second chamber, thereby heating the liquid within the second chamber, whilst cooler water from the second chamber flows into the first chamber to be heated therein. After a sufficient time, the entire volume of liquid within the liquid reservoir will reach boiling.

The Applicant has recognized that the provision of at least the first and second valves which are separated by an obtuse angle helps to promote the development of the convection currents which may improve the uniformity of heating in this mode of operation. The Applicant has found that a single valve may restrict the liquid flow between the first and second heating chambers resulting in inadequate mixing of the liquid in each of the chambers. This may cause the liquid within the first chamber to overheat, without causing adequate heating of liquid in the second chamber. Further, overheating of the liquid in the first chamber may result in a build-up of steam within the first chamber. Where the appliance further comprises a suitable control having dry boil detection arranged to shut off the power to the heating arrangement in the instance where dry boil is detected, the Applicant has found that with only a single valve, or with two valves which are insufficiently angularly separated, overheating may be caused which results in this dry boil detection being triggered which thus stops further operation of the appliance. Localized boiling and inadequate mixing may also cause undesirable noise and shaking of the appliance. By providing the first and second valves arranged as set out herein to promote the development of convection currents, this overheating risk may be avoided. Further, the Applicant has found that the stronger the convection currents between the first and second chambers, the more evenly the liquid in the chambers is heated.

In a set of embodiments the first and second valves are in a peripheral portion of the partition—i.e. are further towards the periphery of the partition along a line extending from a center of the partition through the respective valve to the periphery. Thus for example where, as is preferred, the partition is substantially circular, in such embodiments the respective valves would be at least half-way along a radius.

The angular and radial spacing of the first and second valves in the partition may impact the strength of the convection currents which may form. The Applicant has recognized that separating the first and second valves helps to promote the development of convection currents when they are open and the liquid heating appliance is effectively operating in the kettle mode. In a set of embodiments the obtuse angular spacing is at least 120 degrees, e.g. at least 150 degrees. The first and second valves could, for example, be substantially or completely diametrically opposed. Other things being equal, the greater the separation of the valves, the stronger the convection currents may be as there is less chance of warmer water escaping the first chamber through the same valve which cooler water is trying to enter the first chamber. As discussed previously, improving the likelihood of stronger convection currents forming may increase the uniformity and efficiency with which the liquid within the liquid reservoir can be heated.

The heating arrangement may, for example, comprise an underfloor heating arrangement e.g. in the form of a sheathed electrical heating element mounted to the underside of the base of a liquid cavity as is well known in the art. Such a sheathed electrical heating element may, for example, be formed in a horseshoe shape with its electrical terminations at each extreme of the horseshoe. As will be appreciated, with such a horseshoe shaped heating element arranged on the underside of the first chamber, the portion of the first chamber proximal to the space between the two ends of the horseshoe shaped heating element will not be directly heated by the heating element, whereas the rest of the first chamber, particularly the portion immediately next to the heating element, will be heated more directly and thus to a higher temperature. This will result in a temperature differential across the liquid within the first chamber. In a set of embodiments at least one of the first and second valves is arranged immediately above an area between two terminations of the heating element. With the valve arrangement according to this set of embodiments, in use, the temperature of the liquid around the other valve(s) will be higher than the temperature of the liquid around the valve above the terminations. Consequently, convection currents may form such that heated liquid will tend to leave the first chamber via the first valve and liquid will enter the first chamber via the second valve. The separation of the exit and entry of water out of and into the first chamber, further helps to create a strong convection current and thus helps to provide more efficient heating of the liquid.

More generally in a set of embodiments the first and second valves are situated such that they experience differential degrees of heating from a heating element. This could advantageously be achieved by means of the arrangement set out above, although there are other possible ways. For example one of the first and second valves could be situated immediately vertically above a heating element whilst the other could be radially inboard (or outboard) thereof.

Whilst the invention may be implemented with two valves in addition to the float valve, in a set of embodiments, one or more further valves is provided. Having more valves will, in general, enhance mixing through convection currents when the valves are open and reduce the kinetic energy in the boiling liquid. The further valves are preferably distributed between the first and second valve—e.g. such that the first, second and further valve(s) are circumferentially distributed around the partition. References herein to the first and second valves should be treated as referring equally to any such further valves if provided.

The valves may simply comprise open apertures. However in a set of embodiments a grid, grille or mesh layer is provided in one, more than one or all of the respective apertures. This may help to limit the size of bubbles which can pass through the aperture and so help further limit kinetic energy in the boiling liquid.

The partition separating the first and second chambers may be substantially horizontal, at least when the liquid heating appliance is arranged on a level surface. Alternatively, the partition may be arranged at an angle to horizontal, for example in at an angle between 0-10° to the horizontal. In a set of embodiments, however, the partition has a domed shape. In a set of such embodiments, the partition is symmetrical so that the highest point is located substantially at the center of the partition. In a further set of embodiments, the float valve is arranged at the highest point (e.g. the center) of the partition. Arranging the float valve in this position may help to release trapped air within the first chamber as the first chamber is filled with liquid to ensure that it can be filled fully.

Separate valve closure members could be provided for the first and second (and any further) valves. In a set of embodiments a common valve closure member is arranged selectively to close the first and second valves and, where provided, the further valve(s). This simplifies construction and operation. The common valve closure member could take any of a number of suitable forms such as a piston or slide but in a set of embodiments the common valve closure member comprises a hinged flap, e.g. hingedly mounted to the partition so as to be moveable between a raised position in which the valves are open and a lowered position in which the valves are closed.

A hinged flap as set out above will need to have sufficient surface area to cover the openings to the valves in order to close them. Where, as is preferred, multiple valves are provided which are distributed around the partition, the Applicant has recognized that the surface area of such a flap could represent a significant proportion of the internal cross-section of the second chamber even in the raised position and that this could impede the convection currents described previously. In a set of embodiments therefore the hinged flap is provided with one or more apertures between the valves, i.e. between the portions thereof where it is required to close the valves when in its lowered position. The aperture(s) may help permit flow of liquid therethrough when the hinged flap is in its raised position.

The hinged flap will typically need to be shaped so that it does hinder the float valve. It may therefore have an aperture through which the float valve passes when the flap is in its lowered positions and the aperture(s) set out above will be in addition to this.

The liquid heating appliance may comprise a further heating arrangement, for example arranged within the second chamber to provide supplementary heat to the liquid contents thereof. However, the Applicant has recognized that the arrangement of the first and second chambers, with the partition therebetween comprising the first and second valves, means that the heating arrangement arranged to heat the contents of the first chamber may be sufficient to heat liquid in both of the first and second chambers. Therefore, in a set of embodiments, the heating arrangement arranged to heat liquid in the first chamber is the only heating arrangement in the liquid heating appliance. The use of a single heating arrangement, rather than a separate heating arrangement for each of the first and second chambers, may reduce the overall cost and complexity of the liquid heating appliance.

When the first and second valves are open, i.e. the appliance is in the kettle mode, once the liquid within the first and second chambers has been heated, the liquid may simply be poured out of the liquid reservoir. In a set of embodiments, however, the liquid reservoir comprises a spout arranged to allow liquid to be poured out of the appliance. The spout may be arranged on/in the second chamber. A spout may allow for more controlled pouring of liquid from the liquid heating appliance. This may be particularly important, for example when pouring boiling water.

In embodiments comprising a spout, preferably one of the first or second valves, or a further valve where provided, is arranged in the partition substantially below the spout. Positioning a valve in this manner means that when the appliance is used in the kettle mode, as the appliance is tilted in order to pour the liquid out of the spout, it is possible to drain substantially all of the liquid out of the first chamber. As will be appreciated by those skilled in the art, without providing a valve below the spout, a portion of liquid may be trapped within the first chamber when the appliance is tilted. This may be undesirable, for example when the entire contents of the liquid reservoir are required.

In a set of embodiments, the liquid heating appliance further comprises a handle, and one of the first or second valves, or a further valve where provided, is arranged in the partition substantially opposite the handle. As will be appreciated by those skilled in the art, when a user empties the contents of the appliance, the handle will typically be the part of the appliance by which it is tilted. Accordingly, by arranging a valve opposite the handle, this may help to ensure that a maximum amount of liquid can be poured from the liquid reservoir in a similar manner as described above with regard to the spout.

When operating the appliance with the first and second valves closed, i.e. in the hot-cup mode, when the liquid in the first chamber is heated sufficiently it may be dispensed out of the liquid outlet directly to the dispense outlet. As discussed above, the liquid within the first chamber may be expelled from the first chamber under pressure, e.g. steam pressure, which increases within the first chamber as the liquid is heated. When the dispensing of the liquid is driven by steam pressure, steam may escape with the liquid as it is dispensed which may cause erratic dispensing of both steam and liquid out of the dispense outlet. This may be dangerous, as the dispensing of steam may cause injury to a user. In a set of embodiments, therefore, the liquid heating appliance further comprises a dispense chamber arranged between the liquid outlet and the dispense outlet such that liquid first passes via the dispense chamber before passing out of the dispense outlet. The Applicant has recognized that by providing a dispense chamber, as heated liquid passes through the dispense chamber, the heated liquid and steam may separate and thereby allowing the heated liquid to be dispensed in a less erratic manner. This may be safer, and provide a more laminar flow of liquid from the dispense outlet.

The dispense chamber may be arranged within the second chamber, preferably in an upper portion thereof. In a set of embodiments, the dispense chamber comprises a liquid inlet, in communication with the liquid outlet of the first chamber, a first liquid outlet in communication with the dispense outlet, and a second liquid outlet in liquid communication with the second chamber to allow undispensed water to drain back into the second chamber. In a further set of embodiments, the dispense chamber comprises a valve element arranged to selectively close the first or second liquid outlet.

The liquid heating appliance may comprise any suitable arrangement for stopping operation of the heating arrangement, e.g. switching off the power supply, when the temperature of the liquid within either of the first or second chambers reaches a desired temperature. For example, the liquid heating appliance may comprise an electronic controller connected to a thermistor sensitive to the temperature of the liquid in one or both of the first and second chambers. When the electronic controller detects a certain state has been reached, e.g. when boiling has been reached, the electronic controller may shut off the electrical power supply to the heating element in order to terminate heating. In a set of embodiments, however, the liquid heating appliance comprises a thermomechanical element arranged so as to be sensitive to temperature within the appliance, and arranged to switch off a power supply to the heating arrangement when the thermomechanical element detects a predefined temperature. The predefined temperature may, for example, correspond to a typical minimum temperature of steam. A separate thermomechanical element may be provided for each of the first and second chambers, however, in a set of embodiments the thermomechanical element is arranged so as to be used for both the first and second chambers. The Applicant has recognized that the use of a single thermomechanical element may reduce the cost of manufacture of the appliance. The thermomechanical element may comprise a bimetallic sensor, e.g. in the manner of a typical steam switch.

In embodiments comprising a dispense chamber, preferably the thermomechanical element is arranged in, or in fluid communication with, the dispense chamber, and further the dispense chamber comprises a steam inlet arranged to allow the entry of steam from the second chamber. Accordingly, in such a set of embodiments, with the thermomechanical element arranged in the dispense chamber, the thermomechanical element will be capable of detecting steam passing into the dispense chamber indicating that liquid has been heated and dispensed from the first chamber, i.e. in the hot-cup mode of operation. Further, steam in the second chamber can freely pass into the dispense chamber via the steam inlet and thus the thermomechanical element will also be capable of detecting boiling of the liquid in the second chamber, i.e. when the appliance is operating in the kettle mode of operation.

In a set of embodiments, the dispense outlet is moveable between a dispensing position and a non-dispensing position, and is coupled to the valve closure member such that when the dispense outlet is moved into the dispensing position, the valve closure member is moved to close the first and second valves, and when the dispense outlet is moved to the non-dispensing position, the valve closure member is moved to open the first and second valves. The dispensing position may, for example correspond to the dispense outlet protruding out from the appliance and the non-dispensing position may correspond to the dispense outlet being retracted away into the appliance. Accordingly, as will be appreciated by those skilled in the art, a user can use the dispense outlet itself as a means to control the type of operation of the appliance which the Applicant has recognized may be a particularly intuitive means for selecting the type of operation. As the dispense outlet may be immediately visible to a user, it may also allow a user to quickly and easily determine the configuration the appliance is in, e.g. by observing the position of the dispense outlet. The dispense outlet may be moveably arranged in any suitable manner. For example, the dispense outlet may comprise a rotatable or pivoting arrangement which comes out of a body the appliance.

In a set of potentially overlapping embodiments, the dispense outlet is moveable between a dispensing position and a non-dispensing position, and is coupled to the valve closure member such that when the valve closure member is moved to close the first and second valves, the dispense outlet is moved into its dispensing position, and when the valve closure member is moved to open the first and second valves, the dispense outlet is moved into its non-dispensing position. Accordingly, the valve closure member may also be used to move the dispense outlet between its dispensing and non-dispensing positions thereby removing the need for the user to separately operate both the dispense outlet and the valve closure member.

The liquid heating appliance may comprise a heating arrangement within the first heating chamber, e.g. in the form of an immersed heating element, to directly heat the liquid contained therein. In a set of embodiments, however, the liquid heating appliance comprises an underfloor heating arrangement arranged to heat the base of the first chamber. In a further set of embodiments, the liquid heating appliance comprises a sheathed electrical heating element.

The size of the appliance, specifically the volume of the first and second chambers may be dependent on the particular intended use of the appliance. In a set of embodiments, the first chamber has a volume between 50 ml and 500 ml, e.g. 350 ml. Such a volume may correspond to a dispensed volume suitable, for example, for a receptacle such as a mug. This allows a user to heat just enough water for a single mug of heated liquid. As previously discussed, this both speeds up the heating process, and reduces the amount of wasted energy. Providing a first chamber with a volume of for example 350 ml may allow 250 ml of heated liquid to be dispensed when operating in the hot-cup mode. The amount dispensed from the first chamber in the hot-cup mode may be variable and this may be controlled in a number of ways, for example it may be achieved by blocking the flow of liquid after a certain volume has been dispensed or by a variable height weir arrangement.

The liquid heating appliance may be of the corded type, i.e. one in which a power cord is either integrally provided with, or can be directly plugged into, the appliance. In a set of embodiments, however, the liquid heating appliance is a cordless heating appliance. In a further set of embodiments, the liquid reservoir is arranged to mate with a corresponding power base. The liquid reservoir may comprise a cordless electrical connector, and the power base may comprise a corresponding cordless electrical adaptor. The cordless electrical adaptor and corresponding cordless electrical connector on the base may be of the type which allows the liquid reservoir to be placed on the power base substantially irrespective of their relative angular orientation.

As will be appreciated by those skilled in the art, the liquid heating appliance may be used to heat any suitable liquid, e.g. water.

BRIEF DESCRIPTION OF THE DRAWINGS

Some preferred embodiments of the present invention will now be described, by way of example only, and with reference to the accompanying drawings, in which.

DETAILED DESCRIPTION

Figure 1:
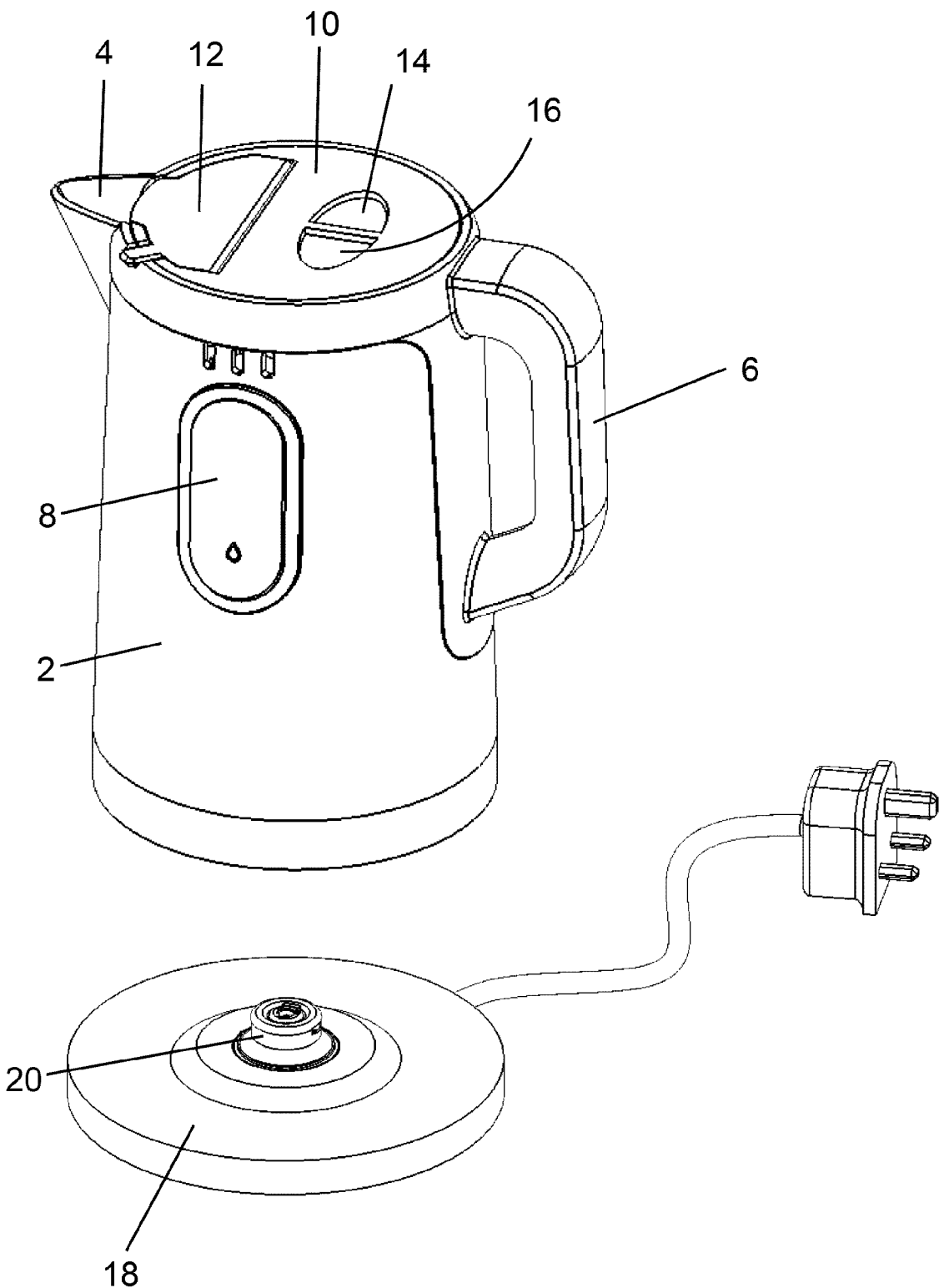
FIG. 1 is a perspective view of a liquid heating appliance in accordance with an embodiment of the invention.

FIGS. 1 to 14 show a liquid heating appliance, or components thereof, in accordance with a first embodiment of the invention. FIG. 1 shows a perspective view of the liquid heating appliance, hereinafter the appliance. The appliance comprises a liquid reservoir 2, a spout 4, a handle 6 and a dispensing outlet flap 8 (shown in a closed position in FIG. 1). The top of the appliance is closed with a lid 10 which carries a filling flap 12 and a pair of on and off buttons 14, 16 respectively. The appliance also includes a cordless power base 18 having a 360-degree cordless base connector 20 provided in the center for supplying the appliance with electricity.

Figure 2:
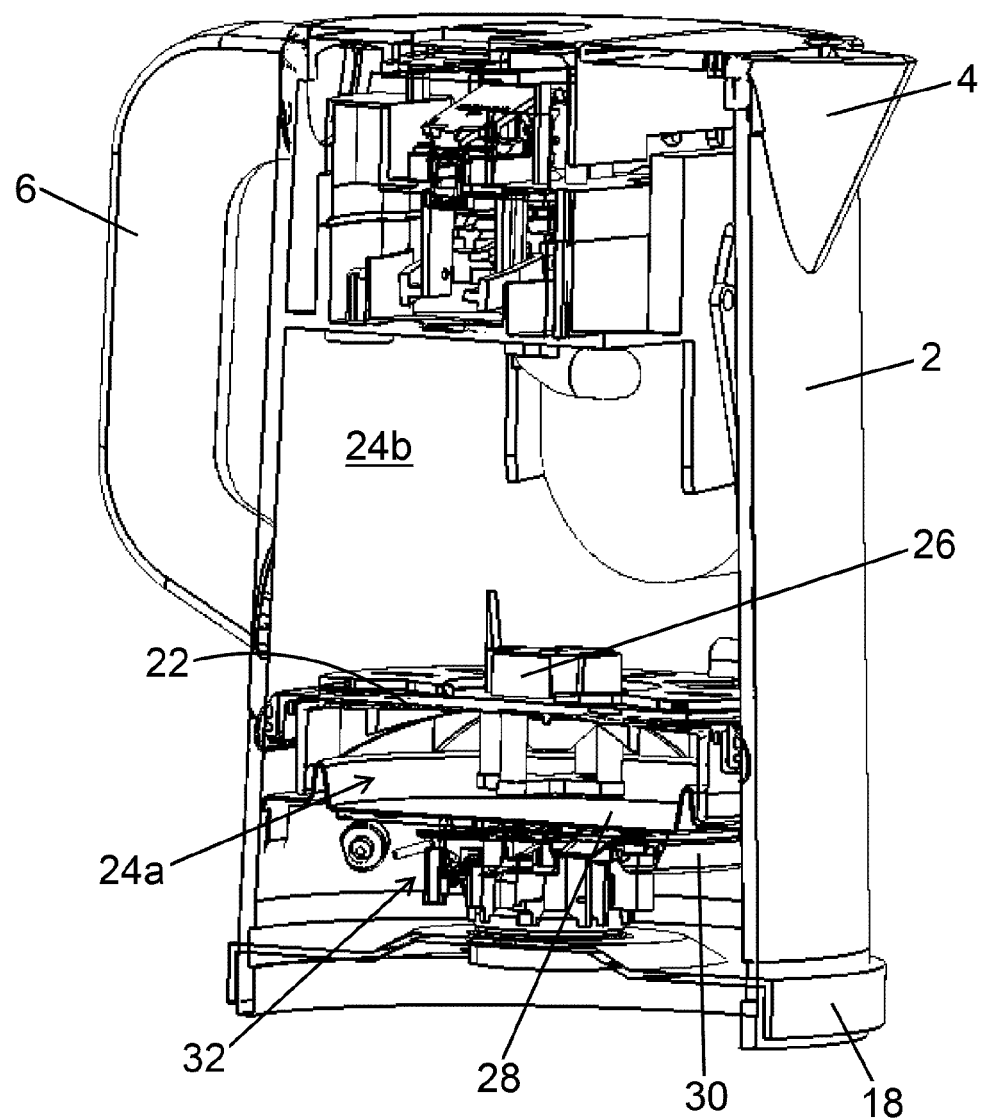
FIG. 2 is a partially cut-away view of the liquid heating appliance seen in FIG. 1.

FIG. 2 shows a partially cut-away view of the appliance showing the inside of the liquid reservoir 2. A partition 22 divides the liquid reservoir 2 into a first chamber 24a and a second chamber 24b. The partition 22 comprises a central float valve arrangement 26 and a number of other valves which are not clearly visible in this Figure but will be described in detail in relation to FIGS. 3 to 5. The base of the first chamber 24a is closed by a metal plate 28, to the underside of which is secured a sheathed heating element 30 and a thermally sensitive control unit 32, well known per se in the art, which receives the cordless electrical connector 20 (see FIG. 1) of the cordless base 18.

Figure 3:
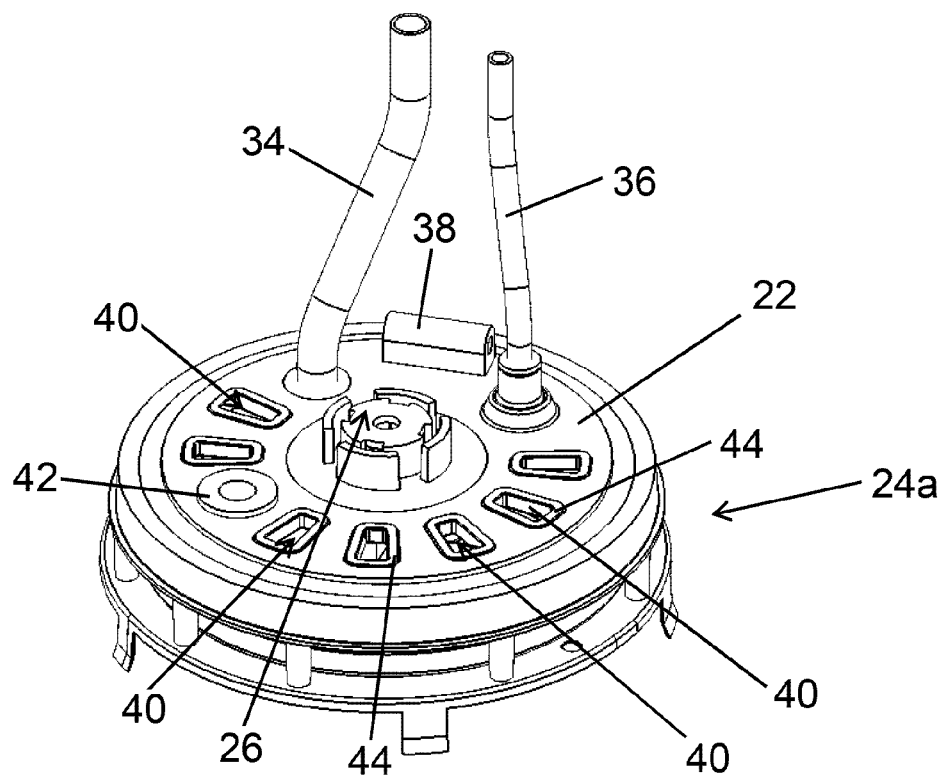
FIG. 3 is an isolated view of the lower first chamber.

FIG. 3 is an isolated view of the lower chamber 24a showing the upper surface of the partition 22. The float valve arrangement 26 can be seen in the center as previously mentioned. This has the same configuration as that found in the Applicant's Hot Cup appliances and is described in greater detail in WO 2008/081159. An approximately vertical dispense conduit 34 is sealed to and extends from the partition 22 towards the rear thereof as viewed in FIG. 3, as does a ventilation conduit 36 which is internally throttled to provide a controlled degree of pressure relief to the chamber 24a. Also in the rear portion of the partition is a hinge mounting boss 38 to which a hinge is attached in use but which is omitted for clarity from FIG. 3.

A series of seven approximately rectangular apertures 40 are distributed around the peripheral portion of the rest of the partition such that their elongate axes are substantially radial. A larger gap between one pair of the apertures 40 accommodates a pressure-relief valve 42. The apertures are each framed by a respective synthetic rubber sealing grommet 44.

Figure 4:
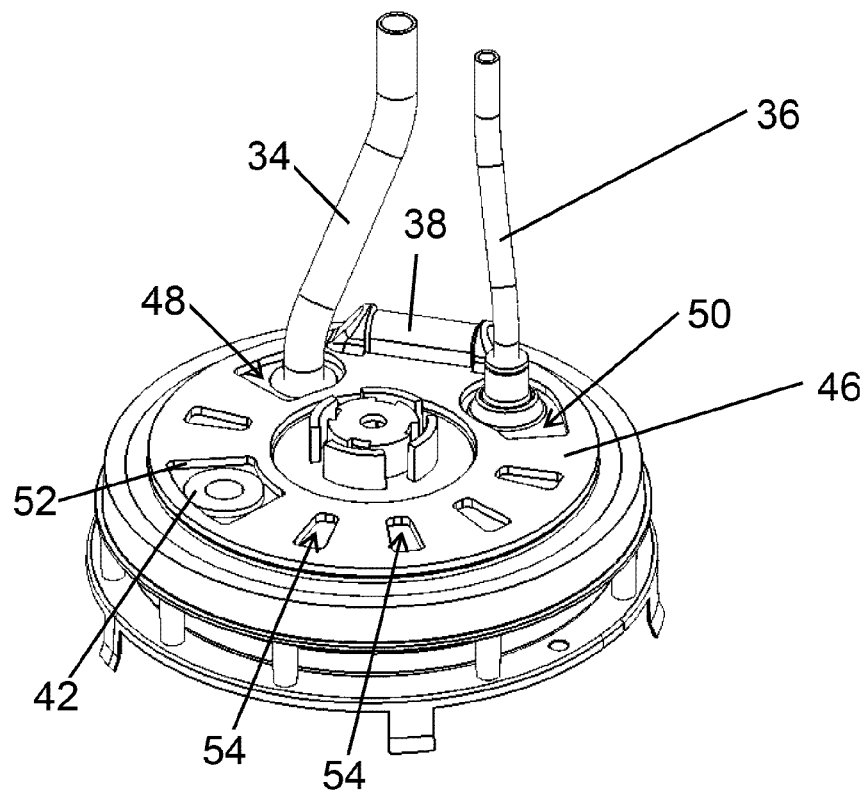
FIG. 4 is a view similar to FIG. 3 with the hinged flap included.
Figure 5:
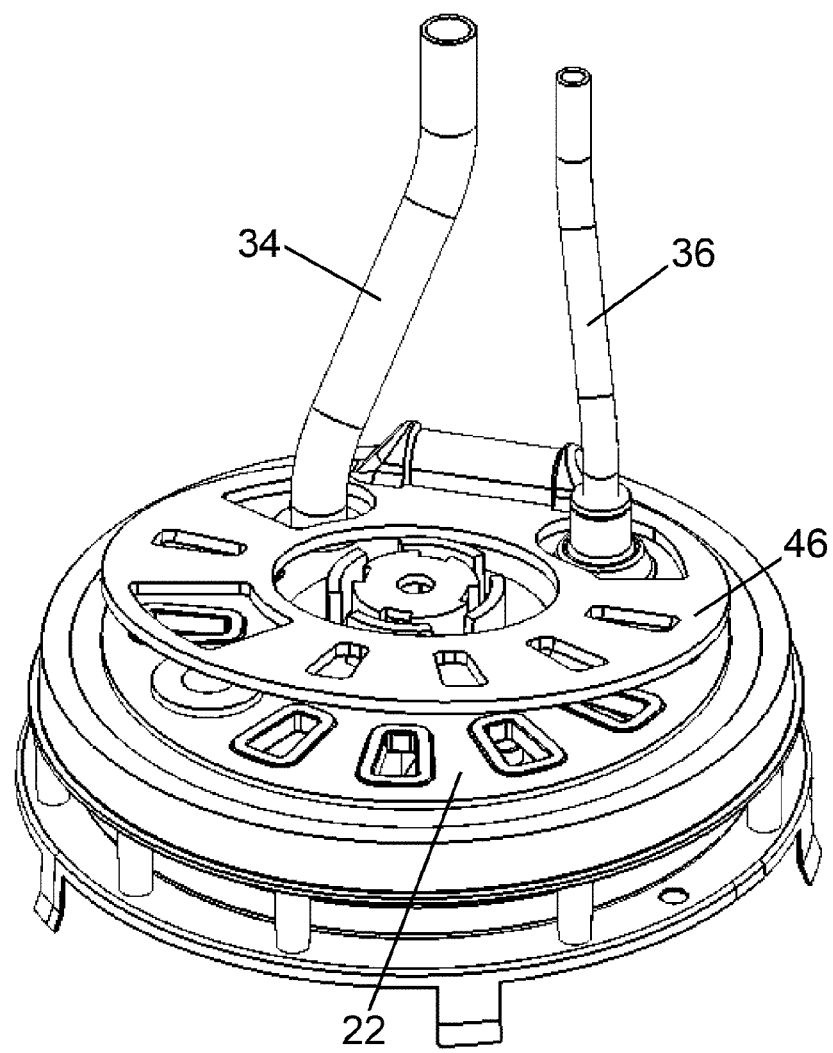
FIG. 5 is a view similar to FIG. 4 with the hinged flap in its raised position.

FIGS. 4 and 5 shows the lower chamber with a hinged flap 46 in place. This is hinged from the previously-mentioned boss 38 so that it can rotate upwardly from the lowered position shown in FIG. 4 to the raised position shown in FIG. 5. The flap 46 defines a number of apertures. Two apertures 48, 50 accommodate the dispense outlet and vent tubes 34, 36 mentioned above respectively. Another aperture 52 accommodates the pressure-relief valve 42. The remaining apertures 54 are arranged so that web portions between them cover and seal the apertures 40 in the partition (with the aid of the respective grommets 44) when the flap 46 is in its lowered position. It can be seen therefore that the apertures 40 in the partition 22 form a series of valves which can be opened or closed dependent on the position of the hinged flap 46 which thus acts as a valve closure member. As will be explained in more detail later, the apertures 48-54 allow water to pass through the hinged flap when it is raised as in FIG. 5.

Figure 6:
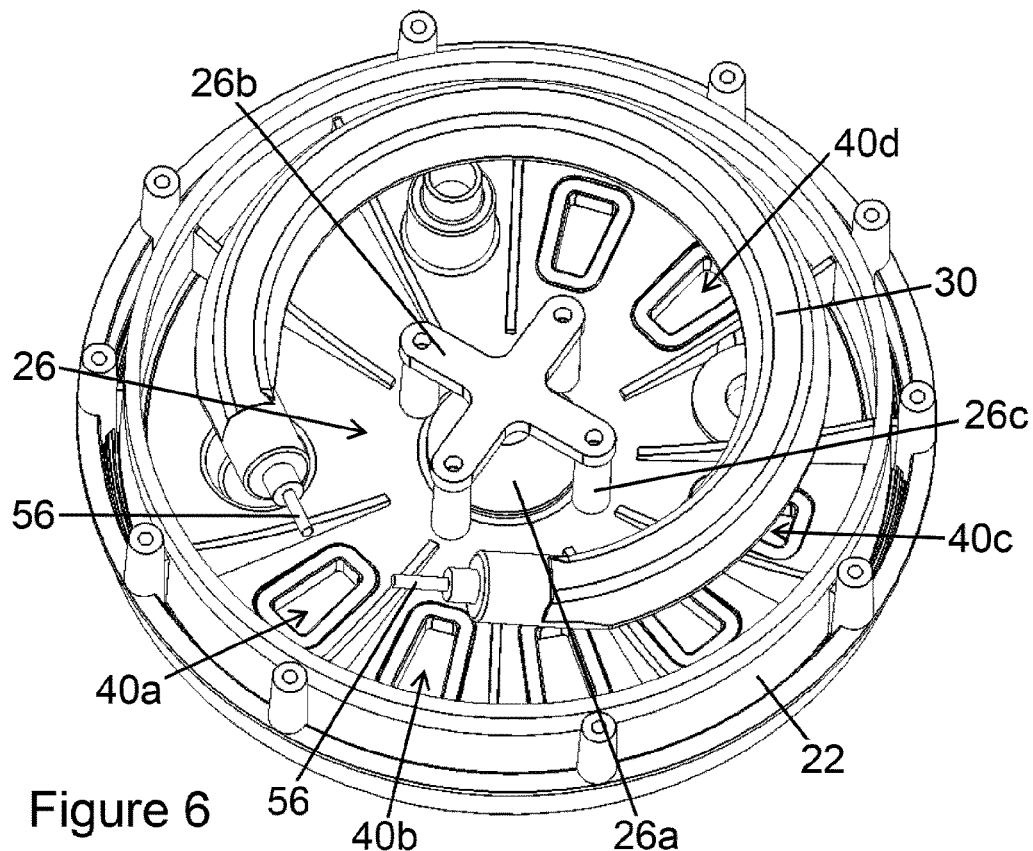
FIGS. 6 and 7 are underside views of the partition showing the relative position of the heating element.
Figure 7:
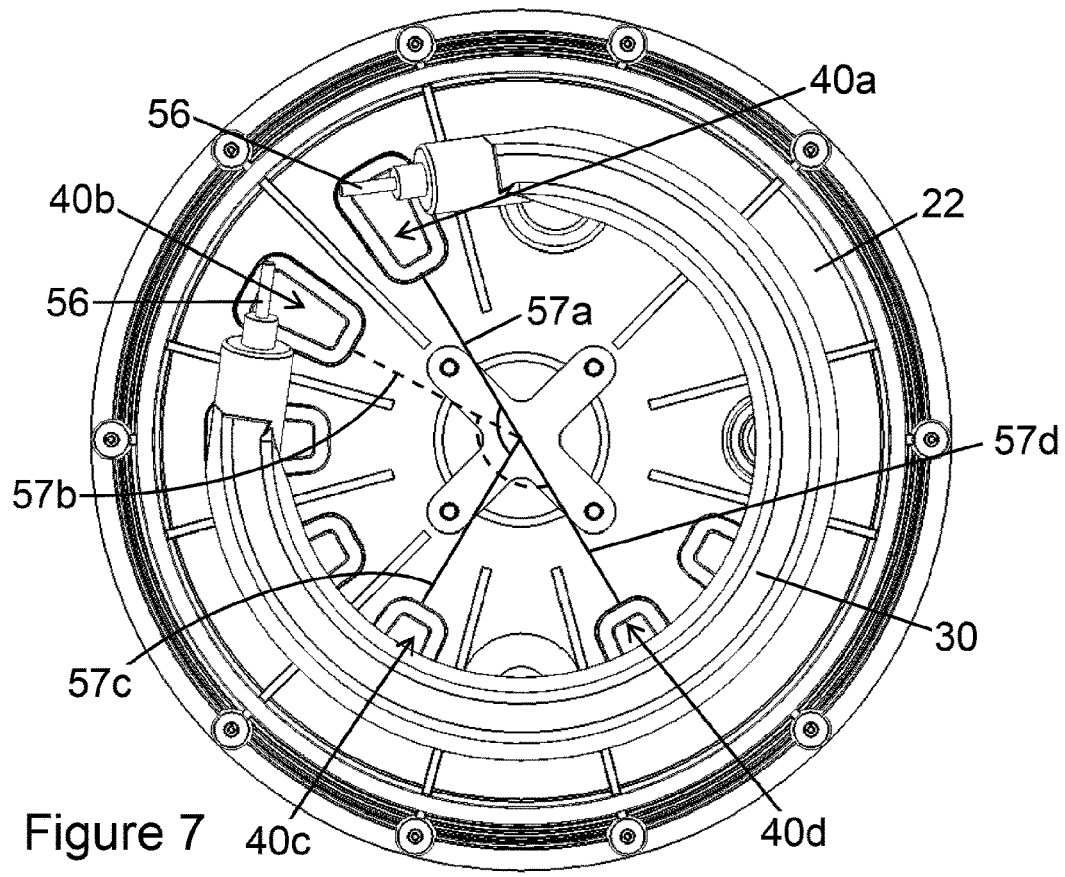

FIGS. 6 and 7 show the partition 22 from the underside and how the sheathed heating element 30 is arranged relative to the rectangular apertures 40 defined therein. It will be appreciated that these views omit the base plate 28 and thermal control unit in order to allow this relationship to be appreciated.

As can be seen in FIG. 6, the central float valve 26 comprises a floating valve member 26a which is constrained by a guide formed of a star-shaped base 26b from which extend four posts 26c. The star-shaped base 26b and four posts 26c together constrain the movement of the floating valve member 26a. Constraining the movement of the floating valve member 26a may help to ensure that the floating valve member 26a reliably closes the valve 26 when required. If it were not suitably constrained, the floating valve member 26a may rotate, or move away from the respective valve seats and no longer be capable of closing the valve 26. As will be appreciated by those skilled in the art, when the first chamber 24a is filled with liquid, e.g. water, the floating valve member 26 will float upwards within the guides 26c.

The sheathed heating element 30 is of a conventional 'horseshoe' construction with a pair of electrical terminations 56 at either end, known in the art as 'cold tails'. As is well understood, this part of the element does not produce a significant amount of heat in use. The area covered by and extending between the two cold tails 56 is therefore heated significantly less than the area directly adjacent the rest of the element 30. It may be seen that this relatively unheated area corresponds to the location of two of the valve apertures 40a, 40b. By contrast the other valve apertures—e.g. 40c, 40d—are located further around the element 30 immediately above the heated part thereof. For example a line 57a joining the center of the aperture 40a to the center of the partition 22 forms an angle of approximately 120 degrees with a similar line 57c joining the center of the aperture 40c to the center of the partition. Also a line 57b joining the center of the aperture 40b to the center of the partition forms an angle of approximately 150 degrees with a line 57d joining the center of the aperture 40d to the center of the partition.

This angular spacing of the valves 40 provides a disparity in the rate of heating which is beneficial in driving convection currents which move water through the partition 22 to mix the water between the upper and lower chambers 24a, 24b.

Figure 8:
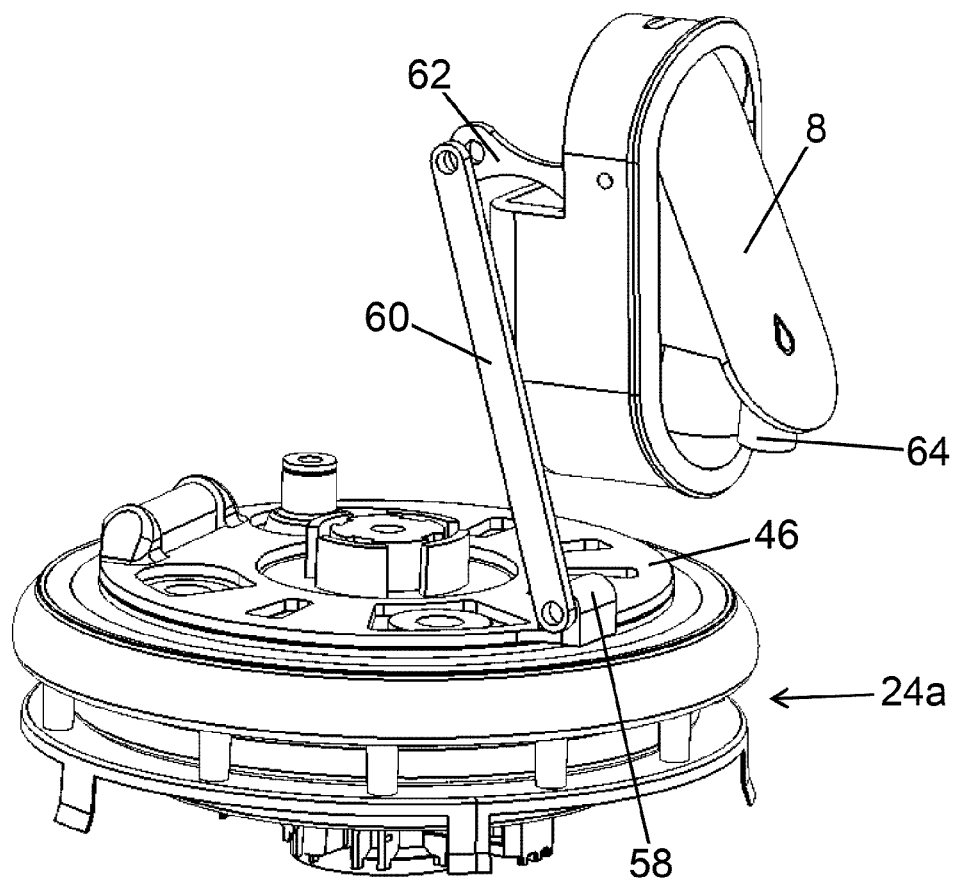
FIGS. 8 and 9 are isolated views showing the linkage between the dispense outlet and the hinged flap.
Figure 9:
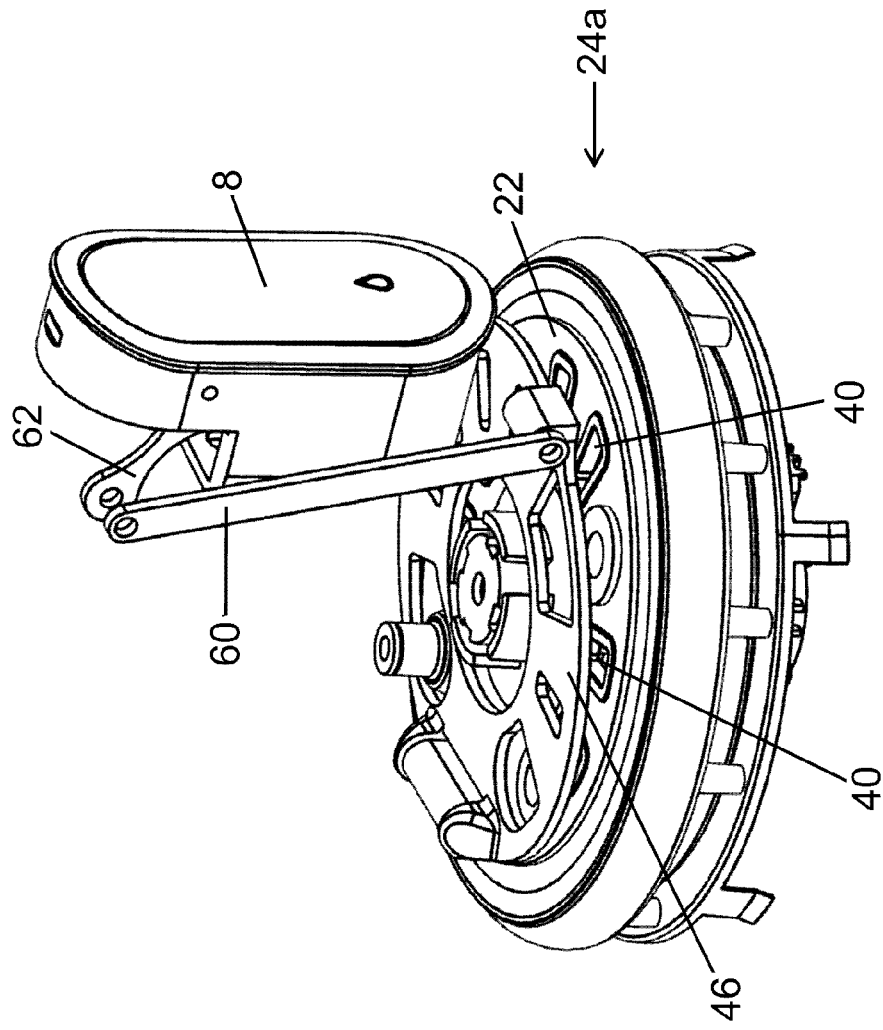

FIG. 8 shows details of the mechanism used to raise and lower the hinged flap 46. Here it can be seen that the flap 46 comprises a hinge boss 58 (omitted from earlier FIGS.) which hingedly mounts one end of a linkage member 60. The other end of the linkage member is connected to a further linkage 62 which is attached to the dispense flap 8. This is shown in FIG. 8 in the protruding position in which the dispense spout 64 is accessible. The same mechanism is shown in FIG. 9 except that in this position, the dispense flap 8 is in its retracted position. As will be apparent, therefore, when the dispense flap 8 is pushed out so that the dispense spout 64 is accessible, the linkage member 60 moves the hinged flap valve closure member 46 to its lowered position, thus closing the valves 40 in the partition 22 between the lower chamber 24a and to the upper chamber 24b. This corresponds to the appliance being in a "hot cup" mode, operation of which will be described below.

By contrast, when the dispense flap 8 is pushed in as shown in FIG. 9, this raises the linkages 60, 62 and therefore raises the hinged flap valve closure member 46, opening the valves 40 between the two chambers 24a, 24b. This corresponds to the appliance being in a kettle mode.

Figure 10:
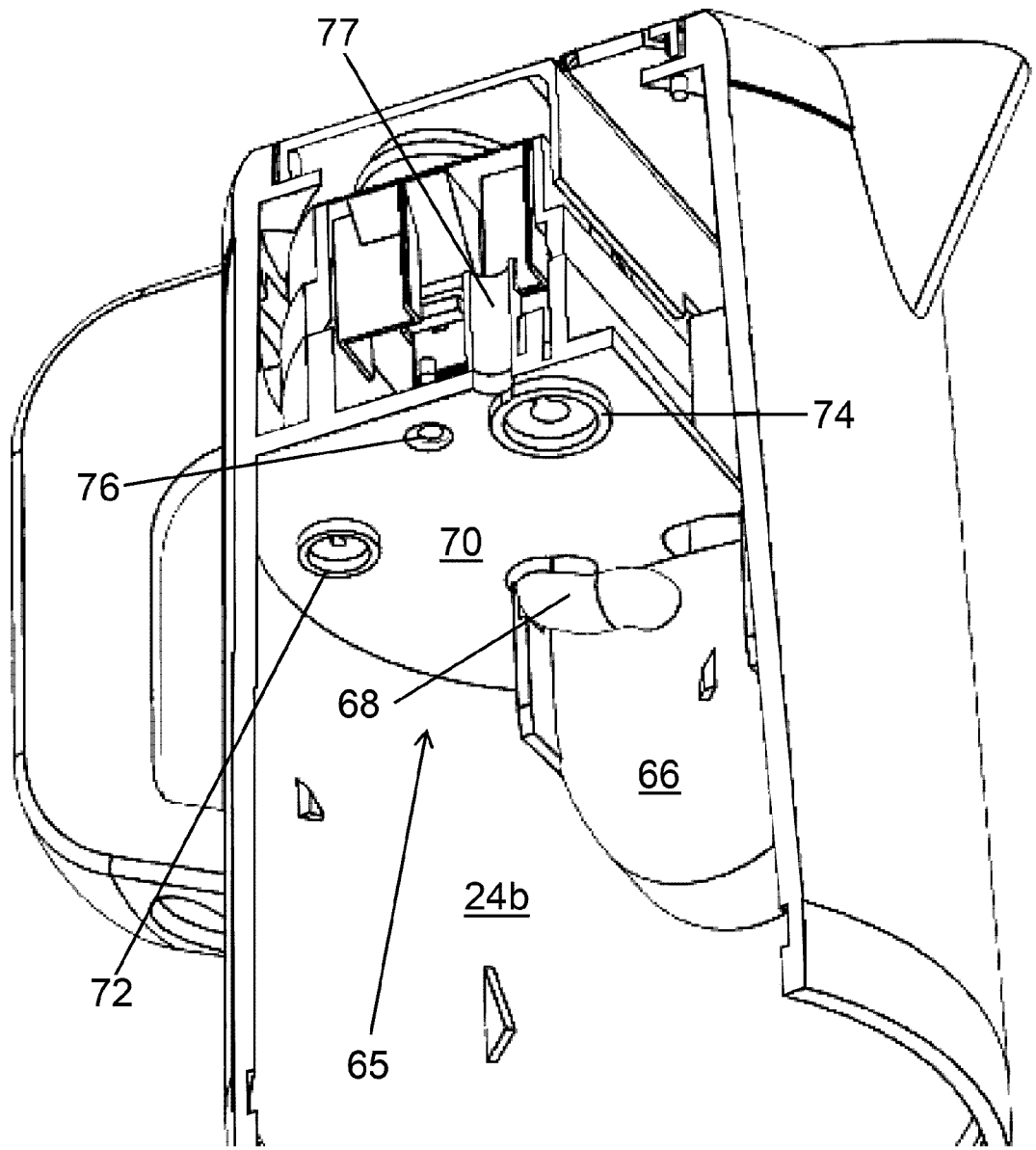
FIG. 10 shows a cross-section of the appliance showing the underside of the dispensing chamber.

Turning to FIG. 10, there may be seen a cross-sectional view showing the upper chamber 24b and the dispense chamber 65. The rear of the housing 66 for the dispense flap may also be seen with a pipe 68 connecting this to the dispense chamber 64. The lower wall 70 of the dispense chamber has four further apertures which may be seen in FIG. 10. One of these apertures 72 is the inlet for the ventilation conduit 36. On the lower wall 70 of the dispense chamber there is also an inlet 74 for the dispense conduit 34, and a drain outlet 76 which selectively allows water in the dispense chamber 65 to drain into the main cavity 24b. A final aperture communicates with a tube 77 projecting into the dispense chamber which acts as an overflow should the level of water rise too high in the dispense chamber. It also assists in allowing steam generated from liquid in the main upper chamber 24b during kettle mode to pass into the dispense chamber 65 for detection by the steam switch (see FIG. 12).

Figure 11:
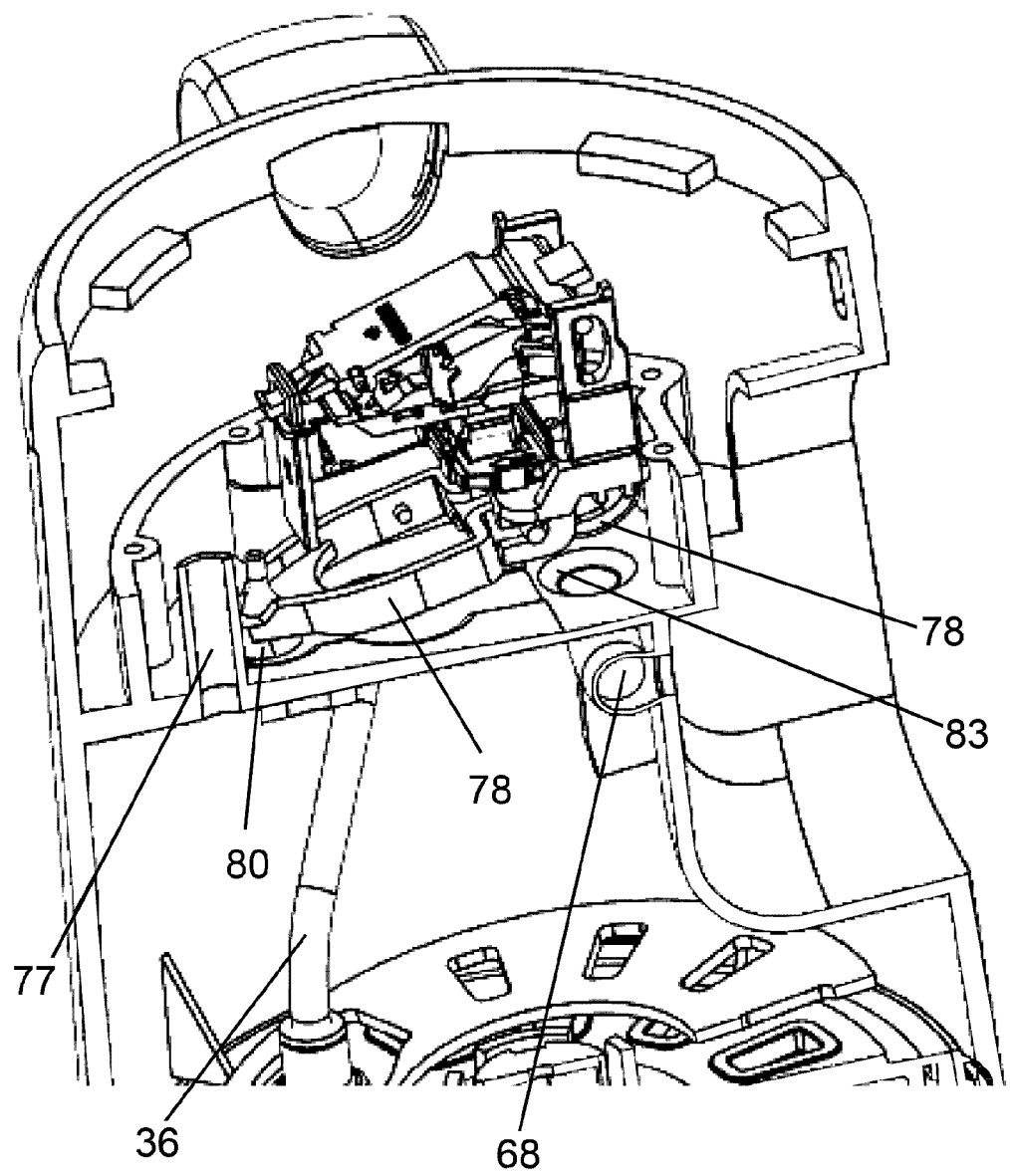
FIG. 11 shows a cut-away view of the dispensing chamber.

FIG. 11 shows an enlarged sectional view of the dispense chamber. In particular there may be seen a rocker valve mechanism including a rocker member 78 with respective valve members 80, 82 at either end. One of the valve members 80 is arranged selectively to close the drain outlet 76 whilst the other valve member 82 is arranged, when it bears on a corresponding valve seat 83, selectively to close the mouth of the pipe 68 leading to the dispense spout. The rocker valve mechanism is shown in greater detail in FIG. 12.

Figure 12:
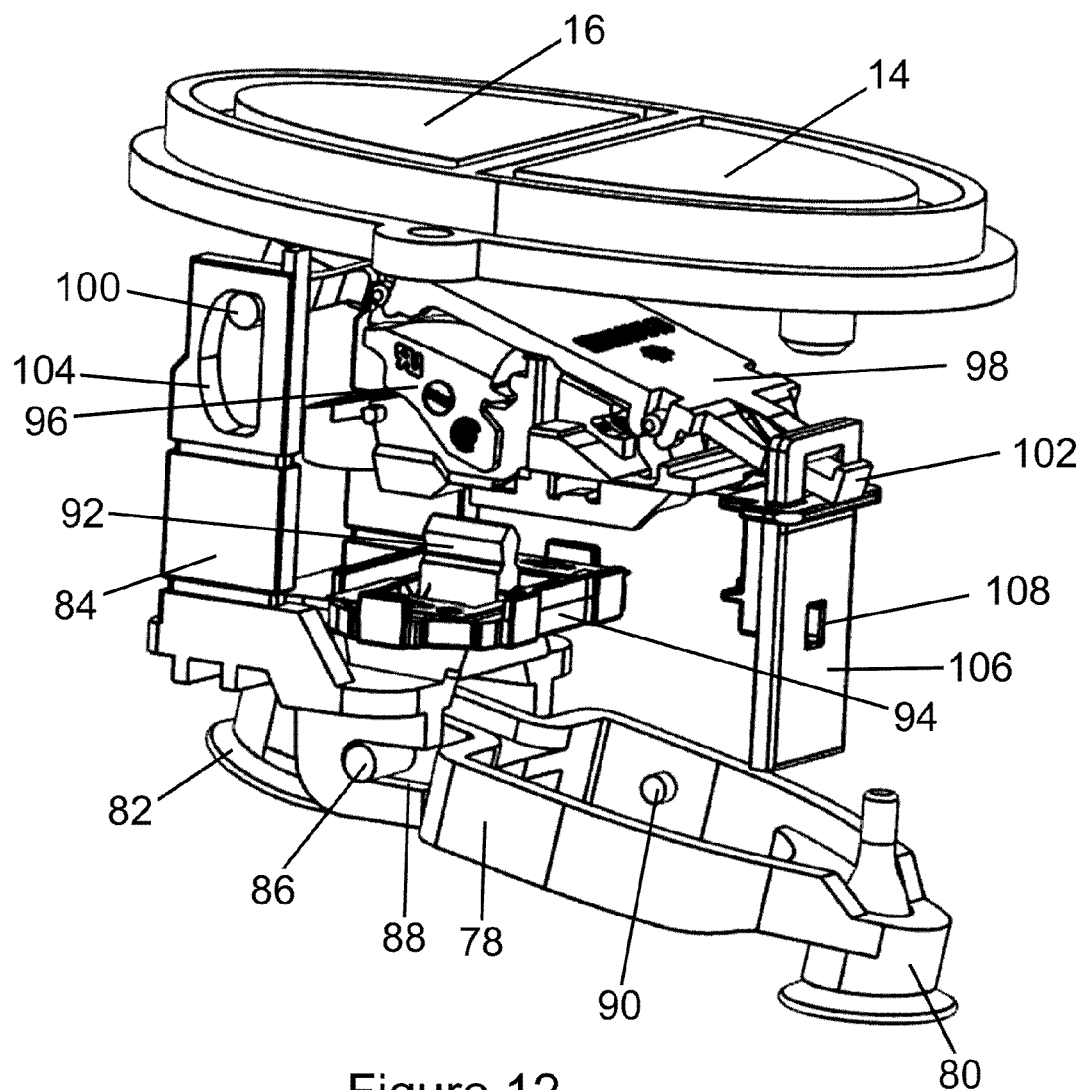
FIG. 12 shows an enlarged isolated view of the rocker valve arrangement.

FIG. 12 shows the rocker valve mechanism in greater detail although from the opposite side to the view of FIG. 11. As can be seen from FIG. 12, the rocker member 78 is acted upon by a yoke member 84 which engages with a pair of laterally protruding pins 86 (only one of which is visible in FIG. 12), received in respective elongated slots 88. This allows vertical movement of the yoke member 84 to be translated into pivotal movement of the rocker member 78. The rocker member 78 pivots about a pair of pivot protrusions 90 (only one of which is seen) which engage in a corresponding frame (not shown in this Figure). A protruding portion 92 of the yoke member engages with an over-center spring actuator 94 so that the rocker mechanism is stable in either of two positions: with a respective one of the valve members 80, 82 engaging with its corresponding valve seat. As will be appreciated by those skilled in the art, a bi-stable spring may be arranged to act on any part of the actuation arrangement in order to hold it in either position.

FIG. 12 also shows a steam-switch 96 which may be one of the Applicant's R48 steam-switches. Coupled to the steam-switch 96 is an actuator member 98. The actuator member 98 has an approximate T-shape with a pair of laterally protruding pins 100 at one end (only one of which is visible), and a tongue portion 102 at the other end. The protruding pin 100 is received in a D-shape slot 104 in the yoke member 84 which means that downward movement of the yoke member 84 will apply force to the protruding pin 100 and thus force the steam-switch 96 into its off position. The reverse is not true—the steam-switch 96 may be moved to its off position without causing movement of the yoke member 84 since the protruding pin 100 has freedom to move downwardly within the D-shape slot 104. At the other end of the actuator 98, the tongue portion 102 engages with a steam gate 106 which has a rectangular aperture 108 defined in it, thus causing it to move vertically upwards when the steam-switch pivots to its off position (anti-clockwise as viewed from FIG. 12).

Finally in FIG. 12, there may be seen the user on and off buttons 14, 16. These are arranged such that downward pressure on the on button 14 provides a downward force on the actuator 98 member 98 which presses the steam-switch 96 into its on position thereby closing the associated electrical circuit as is known in the art. This action causes a corresponding raising of the protruding pins 100 at the other end of the actuator 98 so that if the yoke member 84 is in a lowered position, corresponding to the valve 82 mating with its seat 83 and the other valve 80 being raised, the yoke member 84 will be forced up again, thereby reversing this position.

Conversely, downward pressure on the off button 16 causes tilting of the actuator member 98 in the other direction so that the steam-switch 96 is switched off and the button bears directly on the top of the yoke member 84 pushing it down to move the valve member 82 into mating with its seat 83 and raising valve member 80 away from its seat to open it. This action also raises the steam gate 106 at the other end of the actuator member 98. It will be appreciated therefore that a user can force the rocker member into either of its stable positions using the on and off buttons 14, 16 and this action will also force the steam-switch 96 either on or off, but that the steam-switch 96 can also turn off under its own action without affecting the position of the rocker member 78 and therefore the status of the two valve members 80, 82.

Figure 13:
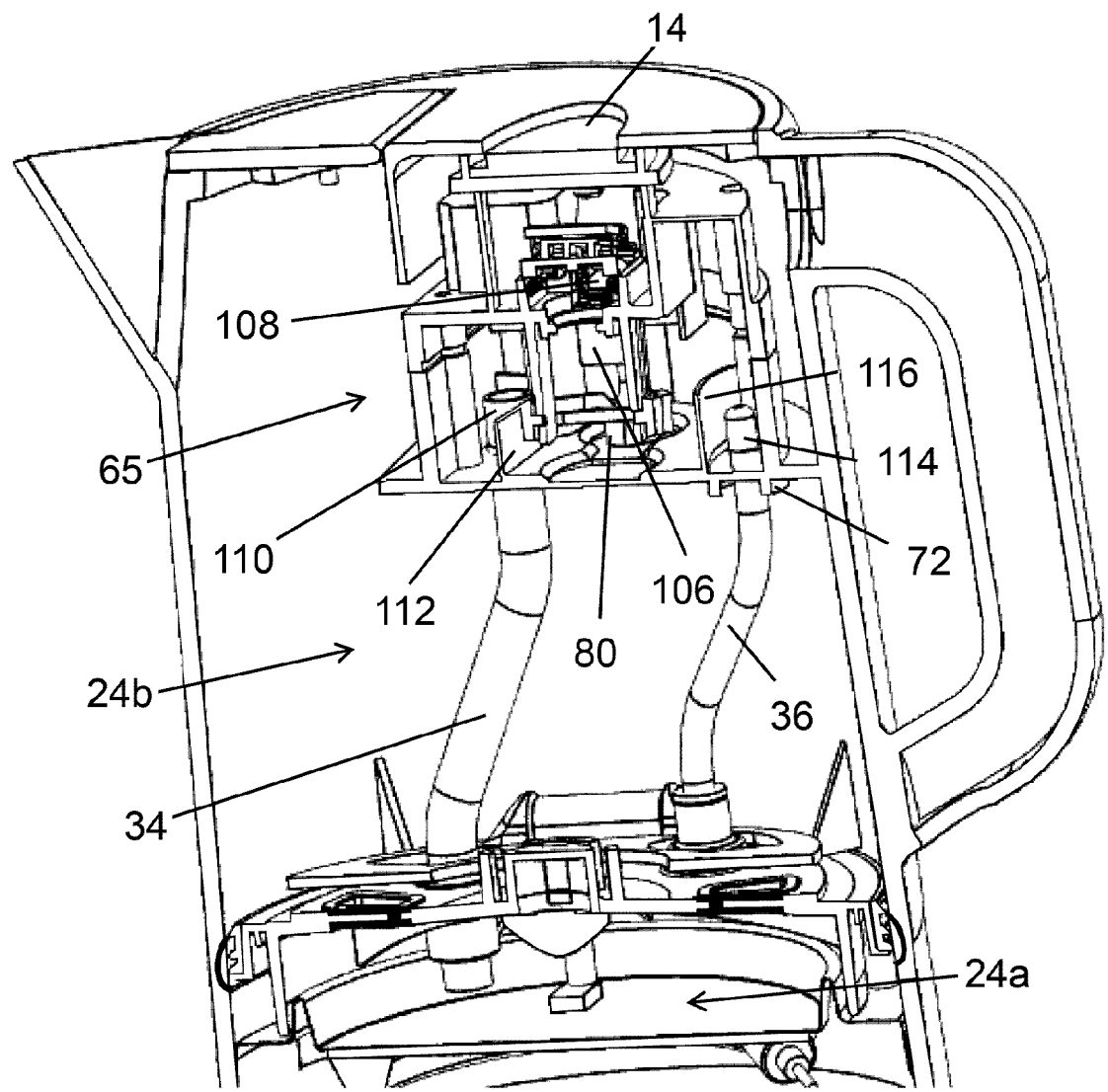
FIG. 13 shows a cross-section of the appliance to reveal the steam inlet and drain outlet on the dispensing chamber.

FIG. 13 shows another cross-sectional view of the appliance and the dispense chamber 65 which shows one of the previously discussed valve members 80 mated with its corresponding valve seat to close the drain outlet 76 (shown in FIG. 10) of the dispense chamber 64. Also visible is the steam gate 106 and in particular the aperture 108 therein which is aligned with a corresponding aperture in the housing, for reasons which will be explained later. This Figure also shows the inlet for the dispense conduit 34 and more particularly the protruding tube 110 which extends upwardly from it inside the dispense chamber 65. This allows boiling water and steam to be conveyed from the lower chamber 24a into the dispense chamber 65 as previously mentioned, but together with a baffle wall 112 which is arranged around it, it helps to prevent water from the dispensing chamber draining back into the lower chamber. The wall 112 may also help to disperse some of the kinetic energy of the water forced up from the lower chamber. A similar protruding tube 114 and baffle wall 116 are provided for the inlet 72 for the ventilation conduit 36.

Figure 14:
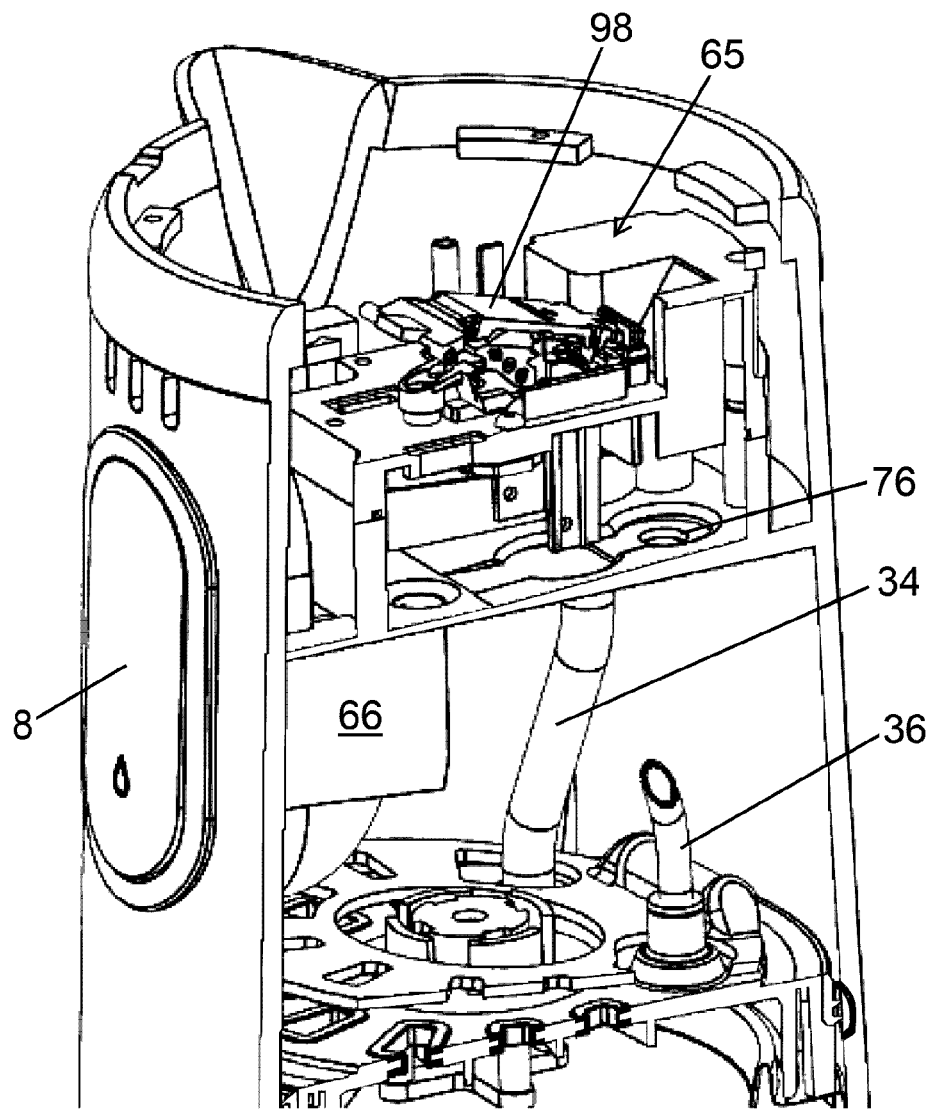
FIG. 14 shows a different cross-section of the appliance on a plane orthogonal to the spout-handle axis.

FIG. 14 shows a cross-sectional view of the appliance with the rocker valve mechanism removed, thereby showing more clearly the drain outlet 76

Operation of the appliance will now be described with reference to FIGS. 1 to 14.

First, the user will fill the appliance by lifting it from the cordless base 18, raising the fill lid 12 and placing under a tap to fill the appliance with water. Water will initially enter the main cavity 24b but will also be allowed to flow into the lower chamber 24a at least through the float valve 26. If, however, the appliance has been left in kettle mode as shown in FIG. 9, water will of course also enter the lower chamber 24a through the additional valves 40. As the first chamber 24a fills up with liquid, the floating valve member 26a will float upwards, within the guides 24c seen in FIG. 6, until they engage with their respective valve seats 58 thereby closing the valves 26.

The user then replaces the appliance onto the cordless base 18 and must now decide whether to operate the appliance in kettle or hot cup mode. This will depend upon the amount of heated water required. If kettle mode is selected, the user will ensure that the dispense flap 8 is pressed in so that the side dispense spout 64 is no longer visible. This is shown in FIG. 9. This will have the effect of raising the hinged flap member 46 and allowing water to flow through the valves 40 in the partition 22. The user will then press the on button 14 which will have the effect of switching on the steam-switch 96 and thereby supplying electrical power to the element 30. It will also have the effect of pulling up the yoke member 84 and thus tilting the rocker valve member 78 so that the valve 80 closes the drain outlet 76 of the dispense chamber 65.

As the element 30 begins to heat the water in the lower chamber, convection currents are set up so that warm water rises out of the lower chamber 24a into the main cavity 24b via the valves 40 and cooler water is drawn in through others of the valves 40. More specifically, as a result of the lower heating power applied to the water in the vicinity of the valves 40a, 40b directly above the cold tails 56 of the element compared to the other valves e.g. 40d, the water will preferentially rise through the valves directly above the element and sink through the valves 40a, 40b near the cold tails 56 so that a strong convection current is set up which causes even heating of the water in the two chambers 24a, 24b. Mixing within the upper chamber is facilitated by the apertures 54 in the hinged flap member 46.

As heating continues, the water in the two chambers 24a, 24b will eventually boil, thus generating steam which passes through the overflow outlet/steam inlet 77 into the dispense chamber 65. This steam eventually reaches the steam-switch 96 which therefore switches into its off state and cuts the supply of electrical power to the heating element. As previously explained, however, this does not cause movement of the yoke member 84 or the rocker valve member 78. Once the element has been switched off as mentioned above, the boiling water may be poured out of the spout 4 by the user lifting the vessel by means of the handle 6 and pouring it in the known way. The appliance may then be refilled and be used in exactly the same way.

If the user decides, after filling, to operate the appliance in the hot cup mode then they simply need to press out the side dispense flap 8 to expose the dispense spout 64. As previously explained, this has the effect of lowering the hinged flap valve closure member 46 and thereby closing the rectangular valves 40 between the upper and lower chambers 24a, 24b. Assuming that the appliance has been filled with sufficient water, the float valve 26 will at this stage be closed and therefore the lower chamber 24a is effectively air-tight apart from the constricted vent conduit 36. When the appliance is then switched on using the on button 14 as before, the element is energized and will begin to heat the water in the lower chamber 24a only.

As the volume of water is heated, the pressure within the first chamber 24a will gradually increase. As the water reaches boiling point, there will be enough steam pressure within the first chamber to force the heated water up the conduit 34 into the dispensing chamber 65. Steam leaving the water which enters the dispensing chamber eventually passes through the small aperture 108 in the steam gate 106 and therefore impinges on the steam-switch 96. This causes the switch to switch off and therefore disconnect electrical power to the heating element. It also causes the steam gate 106 to be raised thereby de-aligning the aperture 108 therein with the aperture in the housing and thus preventing any further steam from impinging on the steam-switch. This aids resetting the steam-switch more rapidly. Thermal energy stored in the sheathed heating element 30 base plate 28 will continue to heat the water within the first chamber 24a until all of the water has been forced, under steam pressure, up the conduit 34 into the dispensing chamber 65. During this process, due to the pressure created by the steam, the floating valve member 26a will be held against its seat, even though it may no longer be floating on the water within the first chamber 24a. This prevents the first chamber 24a from refilling and thus ensures that only the volume of the first chamber 24a is dispensed.

Shortly after the element is switched off, the pressure within the first chamber 24a will then drop and the floating valve member 26a will fall, such that water within the second, upper chamber 24b can refill the first chamber 24a. The appliance may be operated again to provide another mug of boiling water. Of course, the user may instead decide to switch the appliance back into kettle mode at this point. Thereafter operation will be as described previously.

Water within the dispensing chamber 65 may pass out of the dispensing chamber through the open valve 82 and into the tube 68 connecting to the dispense spout 64 where a suitable receptacle such as a mug will have been placed by the user. The dispensing chamber 65 advantageously provides a space for the heated water and associated steam to separate such that it is predominantly the heated liquid which passes out through the dispense outlet 6, rather than a mixture of water and steam which may cause spluttering of the liquid as it is dispensed. This may provide for a more laminar flow of liquid out of the dispense outlet 64, and may reduce the amount of dispensed steam which may be dangerous.

If, during operation in either mode, the user decides to halt operation, they may press on the off button 16 which will have the effect of switching off the steam-switch 96 and therefore cutting power to the element 30, but will also have the effect of pressing down the yoke member 84 and thus tilting the rocker valve member 78 anti-clockwise (as viewed from FIG. 12) such that the drain outlet valve 80 is opened and the dispense outlet valve 82 is closed. This will immediately stop dispensing of any boiling water from the dispense spout 64 and will allow any water remaining in the dispense chamber 65 to drain through the drain outlet 76 back into the main cavity 24b.

Figure 15:
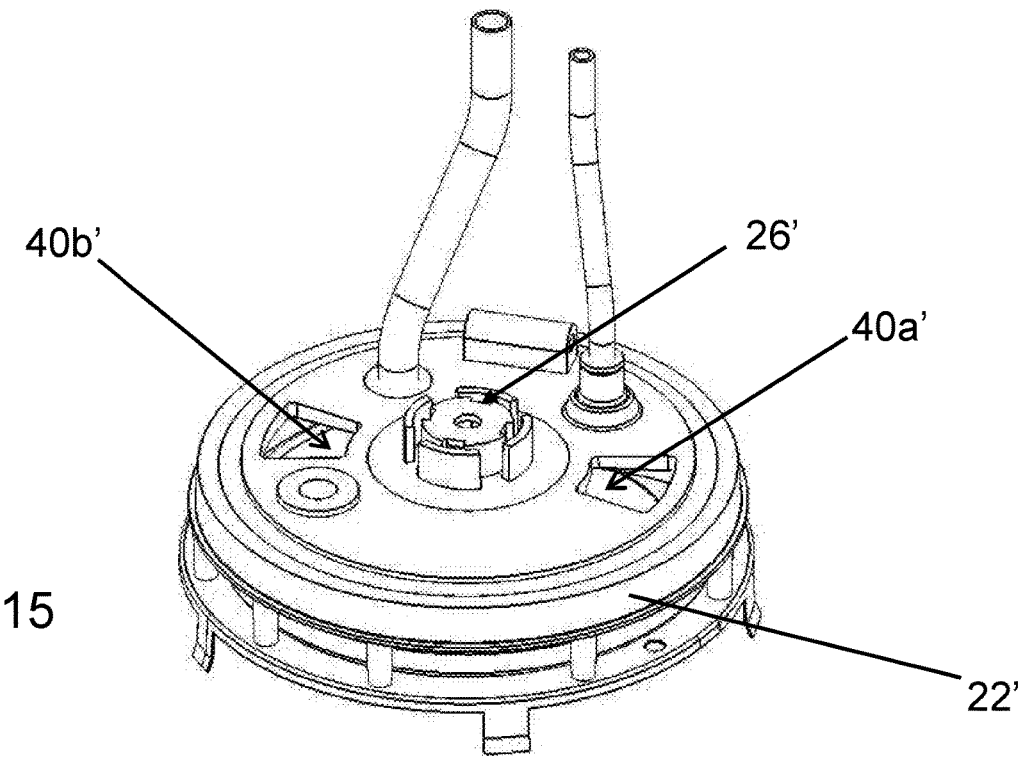
FIG. 15 is an isolated view of the lower chamber in accordance with another embodiment of the invention.
Figure 16:
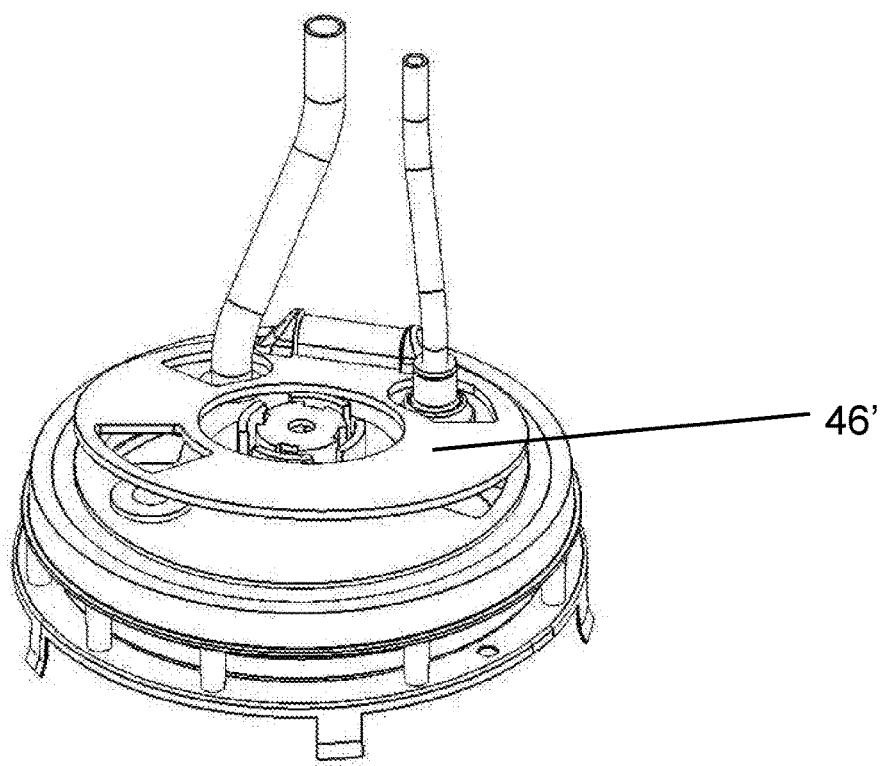
FIG. 16 is a view similar to FIG. 15 with the hinged flap included and in its raised position.
Figure 17:
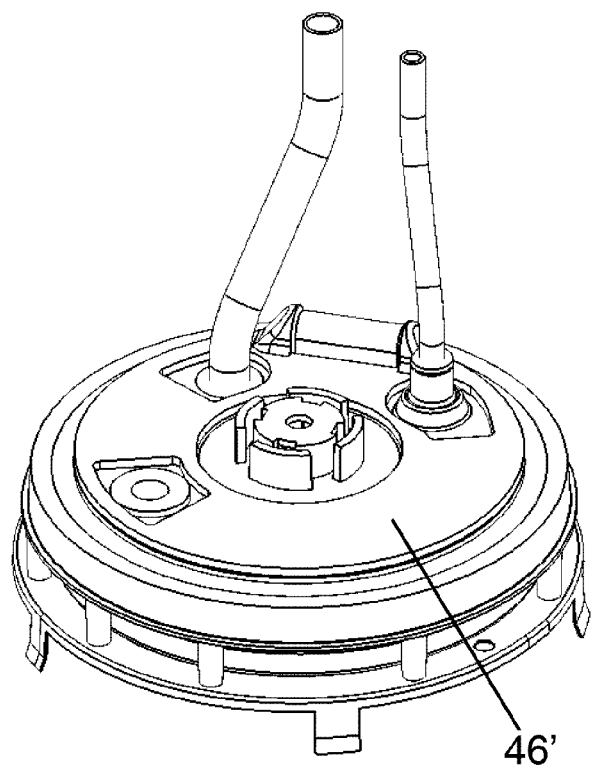
FIG. 17 is a view similar to FIG. 16 with the hinged flap in its lowered position.
Figure 18:
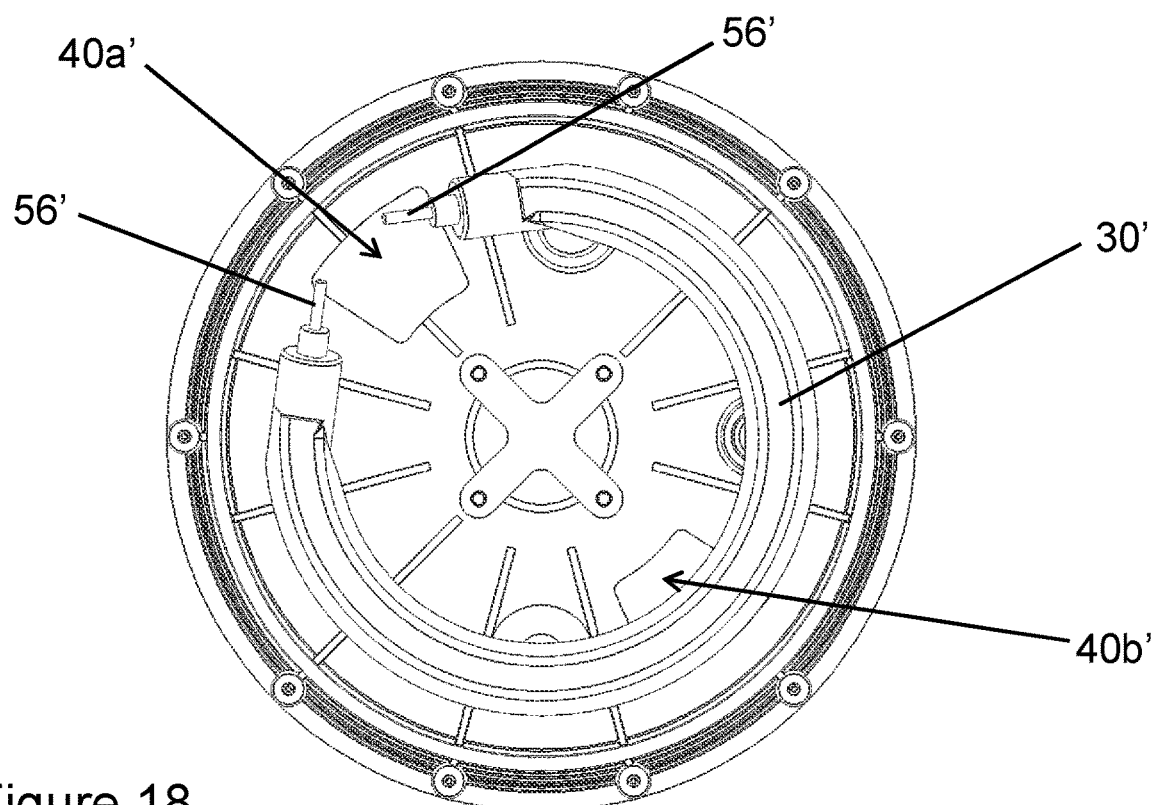
FIGS. 18 and 19 are underside views of the partition of FIG. 15 showing the relative position of the heating element.
Figure 19:
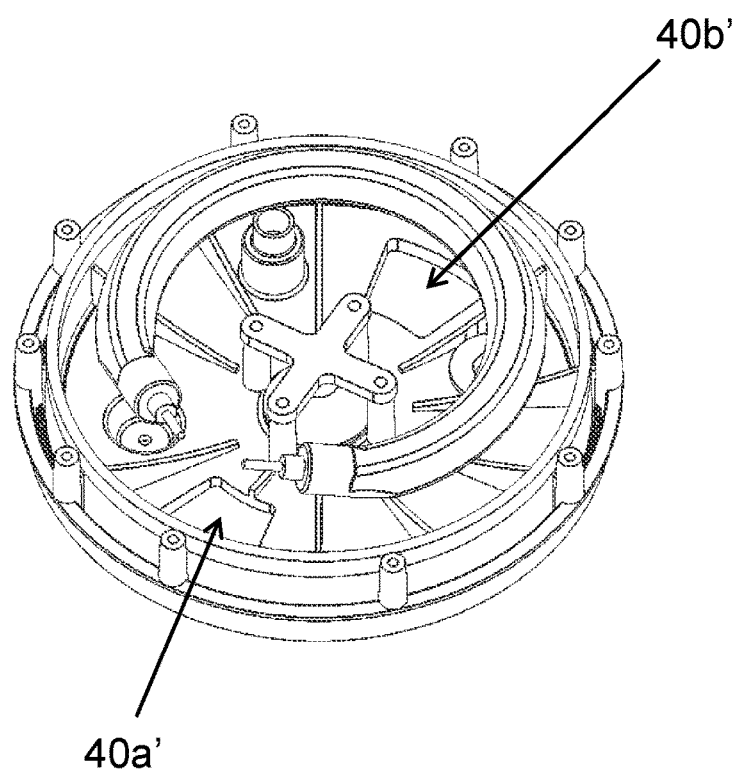

FIGS. 15-17 are isolated views of the lower chamber 24a' in accordance with another embodiment of the invention. By contrast with the first embodiment it will be noted that there are only two (larger) valves 40a', 40b' in addition to the float valve 26' between the lower chamber 24a' and the main cavity (not shown). These retain the feature however that they are substantially diametrically opposed (i.e. have an obtuse angular separation). As may be seen in FIGS. 18 and 19, one of the valves 40a' is above the cold tails 56' of the element 30' whilst the other valve 40b' is above the main, heated part of the element. This sets up strong convection currents as explained in relation to the first embodiment.

With reference to FIGS. 16 and 17, the hinged flap 46' is similarly correspondingly configured to close the valves 40a', 40b' when in the lowered position (FIG. 16) to correspond to the hot cup mode with the dispense flap 8' open and to open them (FIG. 17) when in the raised position to correspond to the kettle mode with the dispense flap 8' closed. It may be noted however that it does not include additional apertures to allow flow of water through it in kettle mode. The aperture to accommodate the conduits and pressure relief valve and the angle to which it is tilted may allow for sufficient circulation.

Thus it will be seen by those skilled in the art that specific examples of the invention have been described but these should not be considered as limiting as there are many different ways in which the invention can be implemented. For example it is not essential for a single common valve member to be provided nor for this to be hinged.

What is claimed is:

1. A liquid heating appliance comprising:
    a liquid reservoir comprising at first chamber arranged below a second chamber and separated by a partition extending therebetween,
    a heating arrangement arranged to heat, in use, liquid contained within the first chamber;
    a first valve, a second valve and a float valve disposed in the partition to selectively allow liquid to flow between the first and second chambers, wherein said first and second valves are arranged such that respective lines joining the first and second valves to a center of the partition have an obtuse angular separation and wherein the float valve comprises a floating valve member arranged to float and mate with a valve seat and thereby close the float valve in order to prevent the flow of liquid through the float valve;
    at least one valve closure member arranged selectively to close said first and second valves; and
    a liquid outlet in the first chamber in fluid communication with a dispense outlet provided on the appliance so as to allow liquid to be dispensed from the first chamber when the first and second valves are closed.

2. The liquid heating appliance of claim 1, wherein the first and second valves are in a peripheral portion of the partition.

3. The liquid heating appliance of claim 1, wherein the liquid heating appliance comprises an underfloor heating arrangement arranged to heat the base of the first chamber.

4. The liquid heating appliance of claim 3, wherein at least one of the first and second valves is arranged immediately above an area between two terminations of the heating element.

5. The liquid heating appliance of claim 1, wherein the first and second valves are situated such that they experience differential degrees of heating from a heating element of the heating arrangement.

6. The liquid heating appliance of claim 1, wherein the liquid heating appliance comprises a respective aperture for each of the first and second valves and the float valve, and wherein a grid, grille or mesh layer is provided in one, more than one, or all of the respective apertures of the first and second valves and the float valve.

7. The liquid heating appliance of claim 1, wherein the partition has a domed shape.

8. The liquid heating appliance of claim 7, wherein the float valve is arranged at the highest point of the partition.

9. The liquid heating appliance of claim 1, wherein a common valve closure member is arranged selectively to close the first and second valves.

10. The liquid heating appliance of claim 9, wherein the common valve closure member comprises a hinged flap moveable between a raised position in which the first and second valves are open and a lowered position in which the first and second valves are closed.

11. The liquid heating appliance of claim 10, wherein the hinged flap is provided with one or more apertures between the first and second valves.

12. The liquid heating appliance of claim 1, wherein the heating arrangement arranged to heat liquid in the first chamber is the only heating arrangement in the liquid heating appliance.

13. The liquid heating appliance of claim 1, wherein the liquid reservoir comprises a spout arranged to allow liquid to be poured out of the appliance.

14. The liquid heating appliance of claim 13, wherein one of the first or second valves is arranged in the partition substantially below the spout.

15. The liquid heating appliance of claim 1, wherein the liquid heating appliance further comprises a handle, and wherein one of the first or second valves is arranged in the partition substantially opposite the handle.

16. The liquid heating appliance of claim 1, wherein the liquid heating appliance further comprises a dispense chamber arranged between the liquid outlet and the dispense outlet such that liquid first passes via the dispense chamber before passing out of the dispense outlet.

17. The liquid heating appliance of claim 16, wherein the dispense chamber comprises a liquid inlet, in communication with the liquid outlet of the first chamber, a first liquid outlet in communication with the dispense outlet, and a second liquid outlet in liquid communication with the second chamber to allow undispensed water to drain back into the second chamber.

18. The liquid heating appliance of claim 16, wherein:
    the liquid heating appliance comprises a thermomechanical element arranged so as to be sensitive to temperature within the appliance, and arranged to switch off a power supply to the heating arrangement when the thermomechanical element detects a predefined temperature; and
    the thermomechanical element is arranged in, or in fluid communication with, the dispense chamber; and
    the dispense chamber comprises a steam inlet arranged to allow the entry of steam from the second chamber.

19. The liquid heating appliance of claim 1, wherein the dispense outlet is moveable between a dispensing position and a non-dispensing position, and is coupled to the valve closure member such that when the dispense outlet is moved into the dispense position, the valve closure member is moved to close the first and second valves, and when the dispense outlet is moved to the non-dispensing position, the valve closure member is moved to open the first and second valves.

20. The liquid heating appliance of claim 1, wherein the dispense outlet is moveable between a dispensing position and a non-dispensing position, and is coupled to the valve closure member such that when the valve closure member is moved to close the first and second valves, the dispense outlet is moved into its dispensing position, and when the valve closure member is moved to open the first and second valves, the dispense outlet is moved into its non-dispensing position.

* * * * *